June 5, 1973     L. C. BLAYDEN ET AL     3,737,304

PROCESS FOR TREATING MOLTEN ALUMINUM

Filed Dec. 2, 1970

INVENTORS.
LEE C. BLAYDEN,
KENNETH J. BRONDYKE &
ROBERT E. SPEAR

By Carl R. Lippert

Attorney

United States Patent Office 3,737,304
Patented June 5, 1973

---

3,737,304
PROCESS FOR TREATING MOLTEN ALUMINUM
Lee C. Blayden, New Kensington, Kenneth J. Brondyke, Oakmont, and Robert E. Spear, Murrysville, Pa., assignors to Aluminum Company of America, Pittsburgh, Pa.
Filed Dec. 2, 1970, Ser. No. 94,313
Int. Cl. C22b *21/06*
U.S. Cl. 75—68 R    13 Claims

ABSTRACT OF THE DISCLOSURE

The sodium, oxide and hydrogen content of molten aluminum is drastically reduced by moving the molten aluminum through two purifying zones. In each zone the molten aluminum is moved through a bed of refractory bodies in contact with fluxing gases. Conditions are carefully maintained to remove impurities while preventing deterioration of the beds. The process can be operated on a pollution free basis and yet achieve extremely low impurity levels.

BACKGROUND

Figure 1:
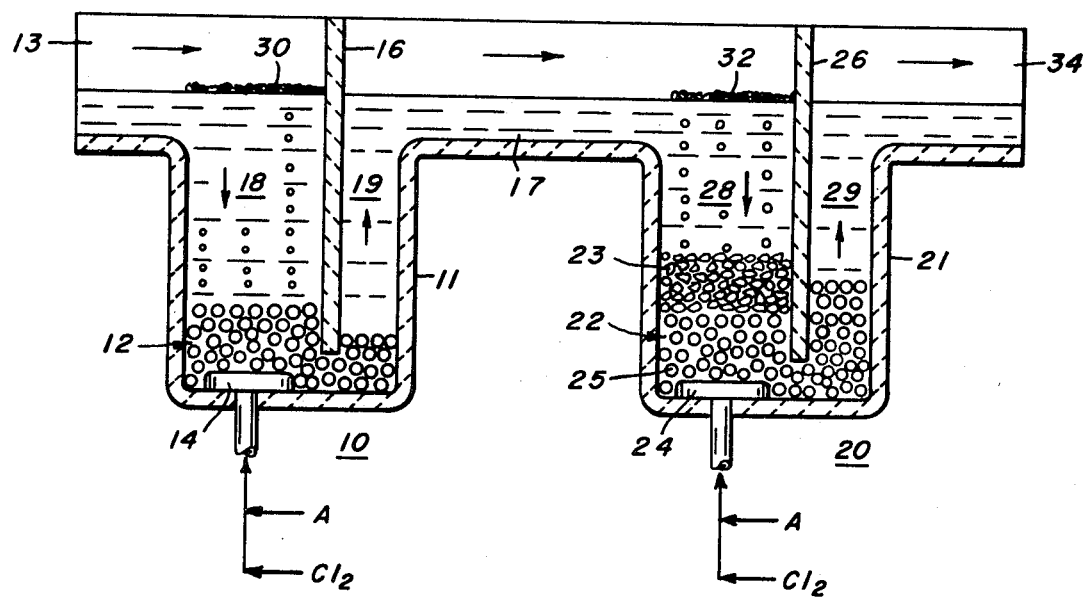

This invention relates to the treatment of molten aluminum to remove gas, finely divided non-metallic particles including oxides and dissolved metallic impurities especially sodium.

In melting aluminum and transferring it a considerable amount of impurities is often introduced into the melt. These impurities include gas (typically hydrogen from moisture in the atmosphere) non-metallic impurities (mostly being derived from the aluminum oxide film on the melt charge or that which forms on the surface of molten aluminum as it is melted and transported) together with sodium or other metallic impurities which can be introduced in the smelting process. It is important that these impurities be reduced to the minimum levels possible. Gases in the solidified metal produce a number of problems in fabricating and using aluminum products as does the presence of oxides. The gas content and oxide content seem to be related in that oxide particles tend to nucleate the formation of hydrogen filled discontinuities.

The presence of sodium interferes with certain fabrication procedures, especially hot rolling where any significant amount causes severe edge cracking during hot rolling reductions. This is especially significant in alloys containing magnesium, for instance 2 to 10% Mg, where edge cracking becomes very serious. It is generally considered necessary in current hot rolling plants that an aluminum-magnesium alloy to be rolled should contain not more than 0.0005% sodium. Through advancements in the art this level can be achieved in commercial aluminum plants although most of processes in use employ chlorine and produce excessive chlorine fumes which create serious pollution problems. The initial reduction of sodium from some relatively high level of for instance 0.005 down to a level of about 0.002 is not especially difficult since this reduction can be achieved simply by exposure of the melt to the surrounding air which permits the sodium to oxidize selectively. However, once the sodium content is down to 0.001% further reductions become much more difficult although, as indicated above, the present state of the art permits of reductions down to 0.0005% on a fairly consistent and reliable basis.

One example of difficulty in reducing the sodium content by chlorination is that the magnesium present in most aluminum alloy melts is ordinarily reacted simultaneously. This occurs even though chlorine, or the reaction product of chlorine with aluminum, aluminum chloride, react with sodium preferentially over magnesium at equilibrium conditions. From considerations of chemical reaction equilibria and the law of mass action, chlorine released in the melt would first be expected to largely form aluminum chloride because aluminum is by far the major component of the melt. Next in sequence, some of the aluminum chloride may encounter and react with magnesium in the melt to form magnesium chloride because magnesium is usually more concentrated than the other melt components capable of reacting with aluminum chloride. Finally, if contact with the metal is maintained long enough, the magnesium or aluminum chlorides encounter the trace amounts of sodium and react to form the final equilibrium product, sodium chloride. Rate of chlorination and magnesium concentration are factors determining how far and how rapidly reaction proceeds through this sequence to the final equilibrium product, sodium chloride. At commonly used chlorination rates, final equilibrium is difficult to achieve without using contact times which are unacceptable in a continuous commercial process. Accordingly, it has been difficult to achieved extremely low sodium levels under commercial production plant conditions which require comparatively large amounts of molten metal to be treated rather rapidly.

It has been found that if the sodium content of an aluminum-magnesium allow could be reduced to 0.0002% or less, and especially to 0.0001% or less, on a commercial basis, marked improvements would be realized especially in hot rolling where heavy reductions of 20% or more per pass could be realized when hot rolling at temperatures of around 750° F. or more. In addition, such low sodium levels foster improvements of 20% or even more in continuous casting rates of ingots of various alloy compositions. However, reaching such low levels of sodium is quite difficult without generating excessive amounts of toxic fumes, particularly in an alloy containing significant amounts of magnesium and especially on a reliable and continuous basis suitable for trouble-free use under commercial production plant conditions.

U.S. Pat. 3,039,864 to Hess, Brondyke and Jarrett describes a process where argon or another non-reactive gas is passed through a bed of refractory bodies in countercurrent flow contact with molten aluminum to remove non-metallic impurities and hydrogen gas from the molten metal. U.S. Pat. 3,025,155 to Lee, Brondyke and Hess describes a process where a small stream of chlorine or another chlorinaceous gas is passed through a bed of refractory bodies in contact with molten aluminum also moving through the bed to reduce the content of metallic impurities such as sodium.

The present invention is basically an improvement on the Hess et al. and Lee et al. processes just mentioned. The improvement enables achieving the best possible efficiencies in terms of sodium reduction, fume free chlorine utilization and gas and non-metallic impurity reduction. In addition, the life of the refractory body beds are extended considerably thereby ensuring extremely long term trouble-free operation which is of great importance in a commercial continuous casting plant.

STATEMENT OF THE INVENTION

Basically the invention contemplates passing molten aluminum through two successive zones, each containing bodies of refractory material such as alumina. Through each bed a stream or streams, of fluxing gases are substantially continuously passed concurrently. The fluxing gases include a non-reactive gas and a chlorinaceous gas, which preferably are, respectively, argon and chlorine. Preferably the gases are present in proportions of about ten to one in favor of the non-reactive gas. The respective fluxing gases complement each other and the refractory body bed in a surprising manner to provide the highest possible operating efficiencies which enable achieving extremely low sodium, hydrogen and inclusion levels at high processing rates.

DESCRIPTION

Figure 2:
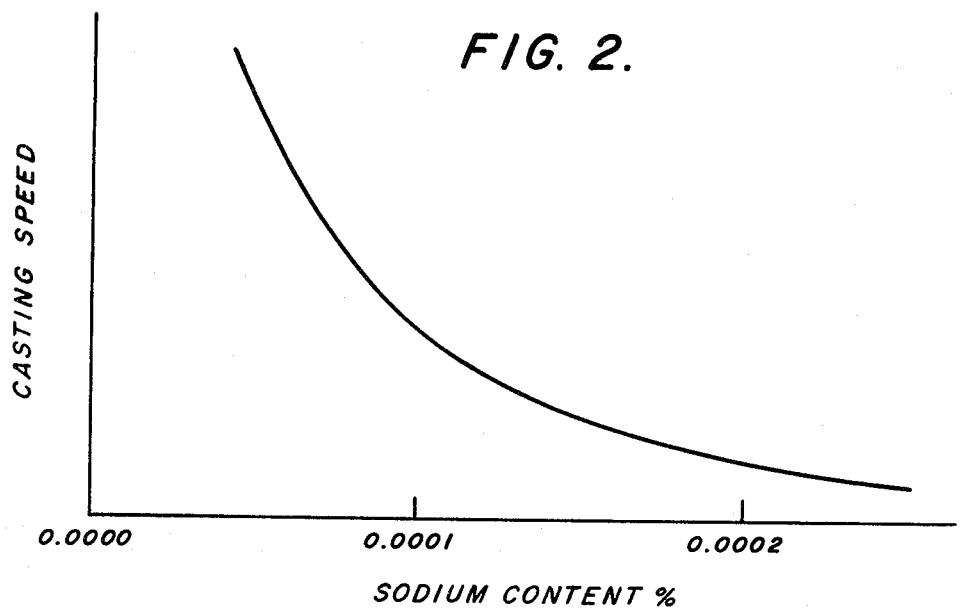

In the description which follows reference is made to the drawings in which:

FIG. 1 is a longitudinal section of a schematic arrangement suitable in the practice of the present invention; and FIG. 2 is a plot illustrating the relation of continuous casting speed with sodium content.

Referring to FIG. 1 the invention contemplates using two metal refining zones, a first zone 10 and a second zone 20. Each zone contains refractory bodies through which the molten metal being treated is passed. Into each bed is introduced fluxing gases comprising a chlorinaceous gas together with a substantially non-reactive gas. In the first zone 10 the molten metal passes through refractory body bed 12 where it contacts the chlorinaceous and non-reactive fluxing gases introduced through dispenser 14. In the embodiment shown the molten metal passes downwardly such that it moves in counterflow relationship with the rising gases. The second zone 20 shown in FIG. 1 is similar to the first zone except that refractory body bed 22 is typically of greater depth and includes at least some smaller sized refractory granules 23.

More specifically, the first zone 10 is contained within housing 11 which may have a substantially square cross section in plan view. Contained in the housing is a bed 12 of refractory particles. The depth of the bed is at least 1 inch and preferably 4 inches or more, a 6-inch deep bed serving the purpose very well. Bed depth refers to the effective depth above the disperser 14, that is, the bed depth where the fluxing gases and molten metal are in contact. The refractory bodies in the bed 12 should be at least ¼ inch in size and preferably ½ inch or more. Three fourths to 1 inch bodies serve quite well. The fluxing gases are introduced into the refractory body bed 12 by a gas dispersing arrangement shown schematically by disperser 14 which may be constructed of porous graphite and should be constructed and arranged so as to distribute the incoming gases throughout the effective section of the bed 12 as uniformly as possible. The housing 11 includes a divider plate 16 which separates the housing into a down leg 18 and an up leg 19 such that the molten metal can flow down the leg 18 and through the refractory bed 12 and then up the leg 19 to the interconnecting channel 17.

After the molten metal exits the first zone 10 it passes into the second zone 20 as by interconnecting channel 17. The second zone may be constructed in substantially the same manner as the first zone such that housing 21 includes a divider plate 26 which separates the housing into a down leg 28 and an up leg 29 such that the molten metal flows down the leg 28 through the refractory body bed 22 and rises up the leg 29 to exit through the outlet 34. As in the first zone, the second zone includes a gas dispersing arrangement 24 constructed to disperse the gas uniformly across the section of refractory body bed 22 on the down leg side of divider 26. The refractory body bed 22 for the second zone 20 differs somewhat from that of the first zone in that it is usually deeper and preferably contains a substantial depth of relatively small refractory bodies or granules 23. These small bodies or granules range in size from about −3 to +14 mesh in the Tyler sieve series. The depth of the small body or granule bed 23 is preferably 6 inches or more, typically about 12 inches. The smaller particles are preferably supported by a bed of larger refractory bodies 25 and the fluxing gases are preferably introduced into the supporting bed. The larger bodies may be much like those in the bed 12 of the first zone 10 and may range in size from ¼ inch to 1 inch with ¾ inch diameter bodies being highly useful and they typically occupy a bed depth of 4 to 10 inches above disperser 24. Operating temperature is about 1250° to 1500° F., with a range of 1300° to 1400° F. being preferred. Some sort of heating means, not shown, are employed to maintain proper temperature. Suitable means include internal immersion heaters, fired or electrical, or external heaters.

The arrangement shown in FIG. 1 features each treatment zone in a separate vessel although this is convenient but not necessary in practicing the invention. The intermediate transfer channel 17 can be eliminated and the up leg 19 of the first zone 10 can be separated from the down leg 28 of the second zone 20 by a common divider plate or wall which would replace the opposite facing walls of the respective housings 11 and 21, the plate running from the bottom surface of a common vessel to the approximate elevation of the bottom of channel 17. Also if desired the respective zones may be situated with the first zone positioned above the second and there are other arrangements which are also contemplated in the practice of the invention although the general arrangement shown in FIG. 1 is quite convenient from the standpoint of construction, operation and maintenance.

Along the lines indicated in U.S. Pat. 3,039,864, it is sometimes desirable prior to initially operating the improved arrangement, or when recharging the bed that the refractory bodies be preheated to a temperature of 1200 to 1600° F., preferably above 1400° F., and then added to the container which has been initially provided with molten metal sufficient to cover the refractory body bed. This technique is especially suited where the bed contains relatively small granules such as portion 23 of the second zone in FIG. 1. Thereafter, molten metal is passed through the bed. In this method of preparation the fluxing gas should be introduced prior to commencement of metal flow to treat the initial body of molten metal if such is desired. Additional information concerning this method of refractory body bed preparation can be found in U.S. Pat. 2,863,558 to Brondyke and Stroup.

The molten aluminum for which the improved treatment is most suited and advantageous contains some amount of sodium, generally ranging from 0.001% or less up to about 0.005%, or even 0.007%, together with some amount of magnesium, typically up to 10%, for instance ½ or 3 to 10% magnesium and the usual oxides and dissolved hydrogen. Such molten aluminum melts can readily be reduced to less than 0.0001% sodium, less than 4 parts per million total oxide content and 0.15 ml. or less of hydrogen per 100 g. of molten aluminum by the practice of the invention without producing toxic fumes.

The extremely low sodium level is quite significant in alleviating edge cracking during hot rolling of alloys such as aluminum-magnesium alloys which are prone to exhibit this defect. Also the very low sodium levels facilitate substantial increases in the rate of continuously casting an ingot. To illustrate the effect of sodium on the rate in a continuous casting system reference is made to FIG. 2 which is a generalized plot illustrating casting rate versus sodium content. From the figure it is apparent that as the sodium content is reduced below 0.0002% and especially below 0.0001%, marked increases in casting rate can be achieved without encountering casting cracks related to hot shortness otherwise encountered as the rate is increased. The figure is rather generalized since the casting rate in terms of ingot length per minute varies according to alloy composition and ingot cross section. However, the relationship shown has been observed for a number of alloys and ingot sizes. That is, as the sodium content is reduced to below 0.0002%, and especially below 0.0001% surprising increases in casting rate are possible.

The reactive chlorinaceous gases which may be employed in practicing the invention include chlorine gas and vaporous chlorides which are reactive with metals more electropositive than aluminum, that is metals such as sodium. The chlorinaceous gas should not introduce any contaminants into the molten metal by reaction there-with or with the refractory bodies. Suitable examples are aluminum chloride and certain chlorinated hydrocarbons such as hexachloaethane, although it is much preferred to use chlorine gas since such is economical and can be handled readily.

The non-reactive fluxing gas should be substantially non-reactive or inert toward molten aluminum. The inert gases of the Periodic Table, helium, neon, argon, krypton and xenon and mixtures thereof are suitable although nitrogen and, to a less desired extent, carbon dioxide may also be employed although, in the latter two instances, precautions are warranted to avoid the formation of nitrides, oxides, carbides and complexes thereof. Argon serves the purpose quite well and is considered preferred as a non-reactive fluxing gas because of its effectiveness and availability.

The refractory bodies preferably are substantially inert to the molten aluminum being treated and the fluxing gases, particularly the chlorinaceous gas. Obviously the bodies must have a sufficiently high melting point to sustain exposure to the molten aluminum. Suitable refractory bodies include chromite, corundum, forsterite, magnesia spinel, periclase, silicon carbide and zircon. Of these tabular alumina (synthetic corundum) is preferred although any form of calcined alumina should be also considered highly suitable.

In each respective zone, zones 10 and 20 in FIG. 1, conditions are carefully maintained to maximize the efficiency of the refining process. Sodium is readily reduced to levels of 0.0002% and even less at the second zone.

Because of the maximized efficiencies derived from the improvement the drastic sodium reductions can be achieved in a high capacity production plant on a fumeless or substantially fumeless basis which offers great advantages where air pollution is of importance. In fact sodium reductions down to 0.00001% and less are readily achieved with no measurable chlorine evolution. That is, employing a standard analytical technique for chlorine in air atmospheres using the Mine Safety Appliances Company detector tube for chlorine and universal sampling pump, the chlorine content of the gas above the melt is measured at 0 part per million. In addition to fume-free sodium reduction, non-metallic impurities and gas content are reduced to, respectively, less than four parts per million total oxide content and less than 0.15 ml. hydrogen per hundred grams of melt. In addition to all these benefits the useful life of the refractory body beds are suubstantially increased over those previously experienced.

As is shown in the Hess et al. and Lee et al. patents discussed above, refractory body beds enhance the fluxing action of gas fluxes and these benefits are utilized to advantage in the present improvements. In addition, however, the present improvement utilizes a surprising development in that the fluxing gases complement each other and the bed in maximizing the effectiveness and efficiencies of all in a cooperative interrelationship. It has been found that the non-reactive gas flux continuously removes from the refractory body bed chlorination reaction products formed in the bed along with the oxide and other non-metallic impurity particles removed from the molten metal in the bed and which could otherwise tend to be trapped in the bed. The chlorinaceous gas flux de-wets the non-metallic impurity particles such that their removal entrains substantially no molten aluminum. The non-metallic impurities and the chlorination reaction products flushed from the bed rise to the surface of the molten aluminum to form a skim, 30 and 32 for zones 1 and 2 respectively, which skim may be conveniently removed periodically The skim is of the so-called "dry" type in that it contains substantially no molten aluminum but contains only solid oxide and other non-metallic particles along with sodium chloride, a dry solid, and perhaps some amount of magnesium chloride, a liquid, although there is no visible evidence of any liquid salt. Flushing the impurities and chlorination products from the bed confers a direct benefit on chlorination efficiency but, in addition, improves the effectiveness of the bed itself with respect to enhancing the fluxing action of both gases. That is, not only does the non-reactive gas flushing aid chlorination, the chlorinaceous gas flux improves the non-reactive gas fluxing action in that melt losses to the skim are minimized. In addition to these surprising interactions, the combination of chlorinaceous and non-reactive fluxing gases in a refractory body bed provides substantially extended bed life over that expected when using either gas flux alone. Thus, the gases surprisingly complement the action of each other and the bed so as to maximize the efficiencies reached in the improved process to provide maximum impurity reductions and fume-free and trouble-free operation for extended periods.

In each zone the respective gases can be introduced to the refractory bed separately as by separate dispersers for each gas. However, it is highly preferred that the refluxing gases be mixed and introduced through a common dispersing system as shown for each zone in FIG. 1. This ensures a highly uniform distribution of each fluxing gas. Accordingly, the improvement contemplates mixing the chlorinaceous and non-reactive fluxing gases to provide a substantially homogeneous gas mixture and introducing this mixture to the refractory body bed. Pre-mixing can be effected by combining the respective gas streams in a single common conduit. The mixed gases should be introduced by spreading substantially uniformly across substantially the entire cross section, or at least a substantial portion, of the fluxing region of each bed, the fluxing region being down legs 18 and 28 in the FIG. 1 embodiment.

In each molten metal purifying zone the non-reactive gas is controlled to provide preferably from 0.005 to 0.5 standard cubic foot per hour (s.c.f.h.) of gas per square inch of refractory body bed cross section normal to the gas travel (horizontal bed section in FIG. 1) and is adjusted to maximize efficiencies in degassing the molten metal and flushing the refractory body bed while avoiding excessive molten metal splashing at the melt surface. A typical rate is 0.1 s.c.f.h. per square inch of bed for a bed about 20 inches deep. The invention contemplates molten metal flow rates of 5 to 75 pounds per hour per square inch of refractory body bed cross sectional areas measured in a plane normal to the metal travel, a horizontal plane in the embodiment shown in the figure. Another way of expressing non-reactive gas flux flow rate is as related to metal flow, the gas flow amounting to from less than 1 to about 100 standard cubic feet per thousand pounds of metal. The herein designated amounts of non-reactive gas flux assure a continuously adequate flushing of the refractory body bed for the purposes described above and to remove gas from the molten aluminum.

The non-reactive gas and the chlorinaceous gas are typically provided in proportion such that there are provided about 1 to 10 parts chlorine to 99 to 90 parts of the non-reactive gas on a volume basis. A preferred proportion is 2 to 5 parts chlorine to 98 to 95 parts of the non-reactive fluxing gas. However, on a broader basis the invention contemplates, with relatively low amounts of the non-reactive gas, as much as substantially equal parts of the gas fluxes.

The chlorinaceous gas is typically introduced in amounts to provide about 0.00025 to 0.02 standard cubic feet (s.c.f.h.) of chlorine per square inch of bed cross sectional area measured in a plane normal to the direction of the gas flow, a horizontal plane in the embodiment shown in the FIG. 1. A typical level is 0.01 s.c.f.h. per square inch of bed section for a bed about 20 inches deep. The chlorinaceous gas flow rate can also be expressed as a function of metal in the bed under static flow conditions or moving through the bed under metal flow conditions and a rate of 0.004 to 4 s.c.f. per thousand pounds of molten aluminum is preferred.

The chlorinaceous gas is provided in an amount stoichiometricaly related to the sodium in the molten aluminum which may vary from less than 1 to approximately 10 times, or even 15 times, the theoretical amount of chlorine stoichiometricaly required to react all the sodium present in the melt to form sodium chloride. Where the amount of sodium in the melt entering the first zone is comparatively low, for instance below 0.0008%, the amount of chlorine introduced in the fluxing gas can readily exceed the stoichiometric equivalent of the sodium since, even at 2 or 3 or more times the stoichiometrically amount, very little chlorine is, in fact, introduced to the bed and the excess is readily consumed by reacting with a minuscule amount of magnesium or aluminum in the melt. Where, however, the amount of sodium in the melt, entering the first zone is rather significant, for instance 0.002%, the amount of chlorine should not significantly exceed the stoichiometric portion because of the possibility of significant chlorine gas evolution from the melt.

The specific embodiment shown in FIG. 1 features countercurrent liquid-gas flow which is preferred since it favors longer contact times. However, the advantages of the invention are also largely achieved with other arrangements such as co-current flow.

By carefully controlling the conditions in each zone in accordance with the foregoing, the efficiencies are maximized such that the desired impurity reductions and refractory bed life extension are realized at relatively high metal processing rates in a substantially fume-free process.

In order to demonstrate the practice of the improvement and advantages derived therefrom the following specific examples proceed:

EXAMPLE 1

Aluminum Alloy 3003, containing nominally 1.2% manganese and 0.12% copper, was treated in an arrangement of the type shown in FIG. 1. Each zone had a treatment area, the area of down legs 18 and 28, of about 350 square inches. The first zone had a bed of ¾ inch tabular alumina balls, the bed being about 4 to 6 inches in depth above the outlet of the diffuser. In the second zone there was an 8 inch bed of ¾ inch tabular alumina balls situated above the diffuser outlet along with a 10 inch bed of tabular alumina particles −3 to +14 mesh in size, the smaller bodies being situated above the larger ones. The molten aluminum was processed at a rate of 10,000 pounds per hour which translates to about 35 pounds per hour per square inch of down leg area in both zones. The temperature was 1360° F. Approximately one standard cubic foot per hour (s.c.f.h.) of chlorine and 25 s.c.f.h. of argon were pre-mixed and introduced into each fluxing zone. The sodium in the molten metal before treatment was 0.0011% which was reduced to 0.0003% after the first zone and to 0.0001% after the second zone. The chlorine consumption was approximately 1.7 times the stoichiometric equivalent of the sodium removed in the first zone and approximately 6.5 times the sodium equivalent in the second zone. The hydrogen content of the molten aluminum was reduced from 0.25 ml. per 100 grams melt to 0.18 ml. in the first zone and to 0.10 ml. in the second zone.

EXAMPLE 2

Aluminum Alloy 6063, containing nominally 0.7% magnesium and 0.4% silicon, was treated in an arrangement substantially identical with that discussed in Example 1. The temperature was 1320° F. and metal flow rate was 8,000 pounds per hour which translates to about 12 pounds of aluminum per hour per square inch of down leg area. About 1 s.c.f.h. of chlorine and 40 s.c.f.h. of argon were pre-mixed and introduced to each zone. The sodium content of the melt was reduced from 0.0021% to 0.0012% in the first zone and further reduced to 0.0000% in the second zone. The chlorine consumption for the first and second zones was, respectively, about 1.8 and 1.4 times the theoretical equivalent of the sodium removed. The hydrogen content of the melt was reduced from 0.33 ml. per 100 grams of melt to 0.24 ml. in the first zone and to 0.12 ml. in the second zone.

EXAMPLE 3

In a run similar to that of Example 2, the gas flow rates were altered such that the gas introduced into the first zone contained 2 s.c.f.h. of chlorine and 40 s.c.f.h. of argon and that introduced into the second zone contained 1 s.c.f.h. chlorine and 50 s.c.f.h. argon. The sodium was reduced in the first zone from 0.0032% to 0.0017% and further reduced in the second zone to less than 0.0001%. The amount of chlorine consumed amounted to 2.2 and 1.0 times the theoretical amount in zones 1 and 2 respectively.

EXAMPLE 4

Aluminum Alloy 5052, containing nominally 2.5% magnesium and 0.25% chromium, was treated in an arrangement of substantially identical type with that discussed in connection with the foregoing examples. The temperature was 1300° F. The metal flow rate was about 35,000 pounds per hour which corresponded to about 52 pounds per hour per square inch of area in the down leg in the first zone and 21 pounds in the second zone which was somewhat larger in area than the first zone. About 25 s.c.f.h. chlorine and 70 s.c.f.h. argon were pre-mixed and introduced into the first zone. Approximately 10 s.c.f.h. of chlorine and 170 s.c.f.h. of argon were introduced into the second zone. The sodium content of the melt was reduced from 0.0015 to 0.0006% in the first zone and further reduced to less than 0.0001% in the second zone. The chlorine consumption for zones 1 and 2 was, respectively, 10 and 8 times the theoretical equivalent of the sodium. The hydrogen content of the melt was reduced from 0.33 ml. to 0.26 ml. in the first zone and to 0.10 ml. in the second zone.

EXAMPLE 5

Aluminum Alloy 5182, containing nominally 4.5% magnesium and 0.35% manganese, was treated at 1350° F. in an arrangement of the type discussed in the previous examples. The metal flow rate was 10,000 pounds per hour which translates to a specific flow rate of about 40 pounds of metal per hour per square inch of down leg. About 2½ s.c.f.h. of chlorine and 25 s.c.f.h. of argon were pre-mixed and introduced into the first zone. About 1 s.c.f.h. of chlorine and 25 s.c.f.h. of argon were pre-mixed and introduced into the second zone. The sodium content was reduced from 0.0012% to 0.0002% in the first zone and further reduced to less than 0.0001% in the second zone. The chlorine consumption was 3.3 times the theoretical sodium equivalent in the first zone and 13 times the equivalent in the second zone. The hydrogen content was reduced from 0.4 ml. to 0.25 ml. per 100 g. aluminum in the first zone and further reduced to 0.12 ml. in the second zone.

In each of the foregoing examples the melt exiting the second zone contained less than 4 parts per million total oxide and analysis of the atmosphere immediately above the melt in each zone indiacted a chlorine content of 0 part per million. These examples clearly demonstrate the outstanding efficiencies of the improvement in reaching very low sodium levels at high metal flow rates in a fume-free process.

EXAMPLE 6

A unit of the type shown in the Hess et al. Pat. 3,039,864 was run using argon gas for the purpose of degassification and non-metallic inclusion removal. The unit was run at a metal flow rate of about 8,000 pounds per hour which translates to about 12 pounds of metal per hour per square inch of down leg. The alloy treated was the same as that in Example 2. The unit was run continuously for a three week period at which point the pressure drop across the bed reached a level of 3 to 4 inches of melt and it thus became necessary to temporarily interrupt the operation to replace the refractory body bed. After removal, examination of the 3 to 14 mesh alumina bed particles revealed a considerable amount of non-metallic inclusions and a "dirty" or "gritty" appearance. Under the same conditions with respect to metal composition and flow rate and argon flow rate, a small amount of chlorine was pre-mixed with the argon gas. The respective proportions were about 1 part chlorine to about 40 parts argon. The treatment achieved the same results with respect to removal of non-metallic inclusions and hydrogen as did the previous treatment using only argon as the gas flux. However, the treatment which included the minuscule amount of chlorine was run over 1 month continuously without any interruption and no increase in pressure drop in that the inlet-outlet level differential remained unchanged from initial conditions. The run was terminated after shortly over 1 month for reasons having no connection with pressure drop. Examination of 3 to 14 mesh refractory granules removed from beds where the present improvement was employed reveal a very clean granule condition and an absence of "dirt" or "grit."

While the improvement is described as particularly useful in reducing sodium in aluminum melts, in a broader sense the improvement also contemplates reducing other metallic impurities more electropositive than aluminum such as lithium and calcium.

While the invention has been described in terms of preferred embodiments, the claims appended hereto are intended to encompass all embodiments which fall within the spirit of the invention.

What is claimed is:

1. A process for treating molten aluminum containing sodium, gas, and oxide impurities comprising
    (1) moving the molten aluminum in a first treatment zone through a bed of refractory bodies submerged in molten aluminum and not less than ¼ inch in size, the effective depth of the bed being at least 1 inch,
    (2) further moving said molten aluminum in a second treatment zone through a bed of refractory bodies submerged in molten aluminum and ranging from 3 to 14 mesh in size, the effective depth of the bed being at least 1 inch,
    (3) continuously contacting the molten aluminum moving through each said treatment zone with gaseous fluxes comprising both a chlorinaceous gas flux in an amount stoichiometrically related to the sodium present in said molten aluminum entering each respective zone and a non-reactive gas flux which is provided in an amount at least equal to the volume of the chlorinaceous gas so as to in each treatment zone continuously flush the refractory body bed of chlorination reaction products and chlorinaceous flux de-wetted non-metallic impurity particles thereby causing said products and particles to be removed continuously from the bed in each zone,
thereby to reduce the sodium content of the molten aluminum exiting the second treatment zone to a level of 0.0002% or less and to also reduce the content of gas, oxide and other impurities in said molten aluminum.

2. Improved method according to claim 1 wherein the flow rate of molten aluminum through each treatment zone is 5 to 75 pounds per hour per square inch of refractory body bed cross sectional area in a plane normal to the mean flow path of the aluminum through the bed.

3. A method according to claim 1 wherein said chlorinaceous gas is supplied to each treatment zone in an amount to provide 0.00025 to 0.02 standard cubic feet per hour of chlorine per square inch of refractory body cross sectional area in a plane normal to the flow of the chlorinaceous gas.

4. The method according to claim 3 wherein the chlorinaceous gas is chlorine.

5. The method according to claim 4 wherein the rate of chlorine is further controlled to provide a substantially chlorine-free gas emission from each zone.

6. The method according to claim 1 wherein the non-reactive gas is provided in an amount of 0.005 to 0.5 standard cubic feet per hour per square inch of refractory body bed cross sectional area in a plane normal to the mean flow path of the gas.

7. The method according to claim 1 wherein the non-reactive gas is argon.

8. The method according to claim 1 wherein the chlorinaceous gas is chlorine and the non-reactive gas is argon and wherein the respective gases are provided in portions of about 1 to 10 parts chlorine to 99 to 90 parts by volume of argon.

9. The method according to claim 1 wherein the chlorinaceous and non-reactive gas fluxes are mixed to provide a substantial homogeneous gas mixture which mixture is introduced substantially uniformly throughout the fluxing region of the refractory body bed.

10. The method according to claim 1 wherein the molten metal and fluxing gases move through the refractory body bed in counterflow relationship.

11. A process for treating molten aluminum to reduce its content of impurity metals more electropositive than aluminum and gas and solid non-metallic impurities comprising
    (1) moving the molten aluminum in a first treatment zone through a bed of refractory bodies submerged in molten aluminum and not less than ¼ inch in size the effective depth of the bed being at least 1 inch,
    (2) further moving said molten aluminum in a second treatment zone through a bed of refractory bodies submerged in molten aluminum and ranging from 3 to 14 mesh in size the effective depth of the bed being at least 2 inches, and
    (3) continuously contacting the molten aluminum moving through each said treatment zone with gaseous fluxes comprising both a chlorinaceous gas flux in an amount stoichiometrically related to said impurity metals present in said molten aluminum entering each respective zone and a non-reactive gas flux which is provided in an amount at least equal to the volume of the chlorinaceous gas so as to in each treatment zone continuously flush the refractory body bed of chlorination reaction products and chlorinaceous flux de-wetted non-metallic impurity particles thereby causing said products and particles to be removed continuously from the bed in each zone
thereby to reduce the content of said impurities in the molten aluminum exiting the second treatment zone.

12. A process for treating molten aluminum containing up to 0.005% sodium along with gas and solid non-metallic impurities comprising
    (1) moving the molten aluminum in a first treatment zone through a bed of refractory bodies submerged in molten aluminum and not less than ¼ inch in size, the effective depth of the bed being at least 1 inch,
    (2) further moving said molten aluminum in a second treatment zone through a bed of refractory bodies submerged in molten aluminum and ranging from 3 to 14 mesh in size, the effective depth of the bed being at least 1 inch,
    (3) continuously contacting the molten aluminum moving through each treatment zone with gaseous fluxes comprising both chlorine gas flux and argon gas flux, the argon and chlorine gases being pre-mixed to provide a homogeneous gas mixture which mixture is introduced and spread substantially uniformly throughout substantially the entire fluxing region of each refractory body bed,
        (a) the chlorine being provided in an amount ranging from 0.00025 to 0.02 standard cubic feet per hour per square inch of refractory body cross sectional area in a plane normal to the flow of the chlorine gas and stoichiometrically related to the sodium in the molten aluminum and further control to provide for a gas emission from the treatment zones which is substantially free of chlorine, (b) the argon being provided in an amount ranging from 0.005 to 0.5 standard cubic feet per hour per square inch of refractory body bed cross sectional area in a plane normal to the flow of the argon, thereby continuously flushing the refractory body bed in each treatment zone of chlorine reaction products and non-metallic impurity particles de-wetted by chlorine thereby causing said products and particles to be continuously removed from the bed in each treatment zone, thereby to reduce the sodium content of the molten aluminum exiting the second treatment zone to a level of 0.0002% or less and to reduce the content of gas, oxide and other impurities in said molten aluminum.

13. A process for treating molten aluminum containing sodium, gas, and oxide impurities comprising:

(1) moving the molten aluminum in a first treatment zone through a bed of refractory bodies submerged in molten aluminum and not less than ¼ inch in size, the effective depth of the bed being at least 1 inch, (2) further moving said molten aluminum in a second treatment zone through a bed of refractory bodies submerged in molten aluminum and ranging from 3 to 14 mesh in size, the effective depth of the bed being at least 1 inch, (3) contacting the molten aluminum moving through each said treatment zone with gaseous fluxes comprising both a chlorinaceous gas flux in an amount stoichiometrically related to the sodium present in said molten aluminum entering each respective zone and a non-reactive gas flux which is continuously provided in an amount at least equal to the volume of the chlorinaceous gas so as to in each treatment zone continuously flush the refractory body bed of chlorination reaction products and chlorinaceous flux de-wetted non-metallic impurity particles thereby causing said products and particles to be removed continuously from the bed in each zone thereby to reduce the sodium content of the molten aluminum exiting the second treatment zone to a level of 0.0002% or less and to also reduce the content of gas, oxide and other impurities in said molten aluminum.

References Cited
UNITED STATES PATENTS

| | | | |
|---|---|---|---|
| 3,025,155 | 3/1962 | Lee et al. | 75—68 R |
| 3,087,808 | 4/1963 | Gottschalk | 75—68 R |
| 3,039,864 | 6/1962 | Hess et al. | 75—68 R |
| 3,149,960 | 9/1964 | Robinson | 75—68 R |
| 2,821,472 | 1/1958 | Peterson et al. | 75—68 R |
| 2,840,463 | 6/1958 | Stroup et al. | 75—68 R |
| 2,863,558 | 12/1958 | Brondyke et al. | 75—68 R |
| 3,528,801 | 9/1970 | Bylund et al. | 75—68 R |
| 3,537,987 | 11/1970 | Copeland | 75—68 R X |

L. DEWAYNE RUTLEDGE, Primary Examiner

M. J. ANDREWS, Assistant Examiner

U.S. Cl. X.R.

210—69